US011070496B1

(12) United States Patent
Rae et al.

(10) Patent No.: US 11,070,496 B1
(45) Date of Patent: Jul. 20, 2021

(54) METHOD AND APPARATUS FOR PROVIDING VULNERABILITY FEEDBACK

(71) Applicant: JPMorgan Chase Bank, N.A., New York, NY (US)

(72) Inventors: Alasdair Rae, Stepps (GB); Connor Esplin, Moodiesburn (GB); German Malsagov, Glasgow (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/818,247

(22) Filed: Mar. 13, 2020

(51) Int. Cl.
  *G06F 9/44* (2018.01)
  *G06F 11/36* (2006.01)
  *H04L 12/58* (2006.01)
  *H04L 29/08* (2006.01)

(52) U.S. Cl.
  CPC .......... *H04L 51/02* (2013.01); *G06F 11/3612* (2013.01); *H04L 67/141* (2013.01)

(58) Field of Classification Search
  CPC ..... H04L 51/02; H04L 67/141; G06F 11/3612
  USPC ....................................................... 709/206
  See application file for complete search history.

(56) References Cited

U.S. PATENT DOCUMENTS

| 8,713,554 | B1 * | 4/2014 | Chopra ............... G06F 11/3664 717/168 |
| 8,924,935 | B1 * | 12/2014 | Chopra ..................... G06F 8/71 717/124 |
| 9,405,739 | B1 * | 8/2016 | Nguyen ..................... G06F 8/33 |
| 9,965,257 | B2 * | 5/2018 | Tyler ......................... G06F 8/71 |
| 10,545,855 | B1 * | 1/2020 | Jayaswal ............. G06F 11/3672 |
| 2010/0058291 | A1 * | 3/2010 | Hahn ..................... G06F 11/302 717/113 |
| 2020/0133830 | A1 * | 4/2020 | Sharma ............ G06Q 10/06312 |
| 2020/0201748 | A1 * | 6/2020 | Burrell ................ G06F 11/3684 |
| 2020/0304526 | A1 * | 9/2020 | Abraham ................ G06F 9/455 |

* cited by examiner

*Primary Examiner* — Ruolei Zong
(74) *Attorney, Agent, or Firm* — Greenblum & Bernstein, P.L.C.

(57) ABSTRACT

Various methods, apparatuses/systems, and media for vulnerability feedback mechanism are provided. An application receives data from a build automation tool. This data includes links to source code in a version control system (VCS) and security scans. A processor creates a task and adds the task to an application processing queue. The application retrieves security scan data from security tools. The application retrieves production scan data from the VCS, The processor compares the security scan data with the production scan data; determines, based on comparing, whether the security scan data includes new vulnerability data that is not currently included in the production scan data; and automatically transmits an electronic notification to a code developer device when it is determined that the security scan data includes new vulnerability data and that the task needs resolution.

11 Claims, 4 Drawing Sheets

METHOD AND APPARATUS FOR PROVIDING VULNERABILITY FEEDBACK

TECHNICAL FIELD

This disclosure generally relates to management of vulnerability, and, more particularly, to methods and apparatuses for implementing a vulnerability feedback application device for automatically checking for vulnerabilities and transmitting feedback directly to a developer's computing device (e.g., a code developer's computing device) via an instant messaging chat bot.

BACKGROUND

In today's technology rich business environment, both commercial and non-commercial organizations are increasingly becoming targets for cyber-attacks from hackers, viruses, and other malware. Because of the increasing reliance on connected technology, and the resulting exposure to cyber-attack risk, commercial and non-commercial organizations are increasingly required to monitor new threats either to satisfy regulatory requirements or to retain the trust of customers. Smaller organizations and individual consumers may generally, utilize relatively unsophisticated virus and malware detection software to detect and mitigate threats. However, when the organization becomes large, there arises a need for more proactive approaches. Because of the fact that larger organizations may be more visible to attackers, frequently may have access to higher levels of assets, and generally may have large numbers of software applications and systems, such large organizations may be frequently subject to an increased risk of attack.

Vulnerabilities introduced in new or modified code may only be discovered later in the software development life cycle resulting in a significant loss in efficiency and cost. In addition, vulnerabilities that may be difficult to detect at an earlier stage may also be only discovered later in the software development life cycle resulting in a further significant loss in efficiency and cost. Thus, it may be necessary to detect vulnerabilities at the earliest opportunity and resolve them before continuing development work in order to achieve significant cost and efficiency savings. Even if feature branches are being scanned correctly, the information may be hard to find, and it may be generally not feasible to tollgate feature branches.

SUMMARY

The present disclosure, through one or more of its various aspects, embodiments, and/or specific features or sub-components, provides, among others, various systems, servers, devices, methods, media, programs, and platforms for a vulnerability feedback application device for automatically checking for vulnerabilities and transmitting feedback directly to a developer (e.g., a code developer's computing device) via a chat bot (e.g., an instant messaging software tool), thereby significantly reducing a lot of manual effort for the code developer and increasing efficiency in resolving vulnerabilities.

According to an aspect of the present disclosure, a method for transmitting vulnerability feedback to a code developer device is disclosed. The method may include: establishing a first communication path between an application and a build automation tool via a communication network; establishing a second communication path between the application and a scanning tool via the communication network; receiving data from the build automation tool via the first communication path, the data containing links to source code in a version control system and security scans; creating a task based on the received data and adding the task to an application processing queue; receiving security scan data from the scanning tool via the second communication path; receiving production scan data from the version control system; comparing the security scan data with the production scan data; determining, based on comparing, whether the security scan data includes new vulnerability, data that is not currently included in the production scan data; and automatically transmitting an electronic notification to a code developer device when it is determined that the security, scan data includes new vulnerability data and that the task needs resolution.

According to another aspect of the present disclosure, the method may further include: automatically removing the task from the application processing queue when it is determined that the security scan data does not include any new vulnerability data that is not already included in the production scan data.

According to yet another aspect of the present disclosure, the method may further include: receiving identification information of a code developer associated with the production scan data from the version control system; linking the identification information to the code developer device; and automatically transmitting the electronic notification to the code developer device.

According to further aspect of the present disclosure, the method may further include: automatically transmitting the electronic notification directly to the code developer device via an instant messaging tool.

According to yet another aspect of the present disclosure, the method may further include: receiving identification information of a code developer associated with the production scan data from the version control system; receiving identification information of each team member of the code developer from the version control system based on the identification information of the code developer; and automatically transmitting the electronic notification to the code developer device and to corresponding devices of each team member.

According to an additional another aspect of the present disclosure, the method may further include: automatically transmitting the electronic notification directly to the code developer device and to the corresponding devices of each team member via an instant messaging tool.

According to yet another aspect of the present disclosure, the method may further include: automatically transmitting the electronic notification directly to the code developer device via an instant messaging tool when it is determined that the security scan data includes new vulnerability data and that the task needs resolution.

According to another aspect of the present disclosure, a system for transmitting vulnerability feedback to a code developer device is disclosed. The system may, include a processor and a communication network. The processor may be configured to: establish a first communication path between an application and a build automation tool via the communication network; establish a second communication path between the application and a scanning tool via the communication network; receive data from the build automation tool via the first communication path, the data containing links to source code in a version control system and security scans; create a task based on the received data and add the task to an application processing queue; receive security scan data from the scanning tool via the second communication path; receive production scan data from the version control system; compare the security scan data with the production scan data; determine, based on comparing, whether the security scan data includes new vulnerability data that is not currently included in the production scan data; and automatically transmit an electronic notification to a code developer device when it is determined that the security scan data includes new vulnerability data and that the task needs resolution.

According to further aspect of the present disclosure, the processor may be further configured to: automatically remove the task from the application processing queue when it is determined that the security scan data does not include any new vulnerability data that is not already included in the production scan data.

According to yet another aspect of the present disclosure, the processor may, be further configured to: receive identification information of a code developer associated with the production scan data from the version control system; link the identification information to the code developer device; and automatically transmit the electronic notification to the code developer device.

According to an additional aspect of the present disclosure, the processor may be further configured to: automatically transmit the electronic notification directly to the code developer device via an instant messaging tool.

According to yet another aspect of the present disclosure, the processor may be further configured to: receive identification information of a code developer associated with the production scan data from the version control system; receive identification information of each team member of the code developer from the version control system based on the identification information of the code developer; and automatically transmit the electronic notification to the code developer device and to corresponding devices of each team member.

According to a further aspect of the present disclosure, the processor may be further configured to: automatically transmit the electronic notification directly to the code developer device and to the corresponding devices of each team member via an instant messaging tool.

According to an additional aspect of the present disclosure, the processor may be further configured to: automatically transmit the electronic notification directly to the code developer device via an instant messaging tool when it is determined that the security scan data includes new vulnerability data and that the task needs resolution.

According to another aspect of the present disclosure, a non-transitory computer readable medium configured to store instructions for transmitting vulnerability feedback to a code developer device is disclosed. The instructions, when executed, may cause a processor to perform the following: establishing a first communication path between an application and a build automation tool via a communication network; establishing a second communication path between the application and a scanning tool via the communication network; receiving data from the build automation tool via the first communication path, the data containing links to source code in a version control system and security scans; creating a task based on the received data and adding the task to an application processing queue; receiving security scan data from the scanning tool via the second communication path; receiving production scan data from the version control system; comparing the security scan data with the production scan data; determining, based on comparing, whether the security scan data includes new vulnerability data that is not currently included in the production scan data; and automatically transmitting an electronic notification to a code developer device when it is determined that the security scan data includes new vulnerability data and that the task needs resolution.

According to yet another aspect of the present disclosure, the instructions, when executed, may further cause the processor to perform the following: automatically removing the task from the application processing queue when it is determined that the security scan data does not include any new vulnerability data that is not already included in the production scan data.

According to an additional aspect of the present disclosure, the instructions, when executed, may further cause the processor to perform the following: receiving identification information of a code developer associated with the production scan data from the version control system; linking the identification information to the code developer device; and automatically transmitting the electronic notification to the code developer device.

According to still another aspect of the present disclosure, the instructions, when executed, may further cause the processor to perform the following: automatically transmitting the electronic notification directly to the code developer device via an instant messaging tool.

According to yet another aspect of the present disclosure, the instructions, when executed, may further cause the processor to perform the following: receiving identification information of a code developer associated with the production scan data from the version control system; receiving identification information of each team member of the code developer from the version control system based on the identification information of the code developer; and automatically transmitting the electronic notification to the code developer device and to corresponding devices of each team member via an instant messaging tool.

According to yet another aspect of the present disclosure, the instructions, when executed, may further cause the processor to perform the following: automatically transmit the electronic notification directly to the code developer device via an instant messaging tool when it is determined that the security scan data includes new vulnerability data and that the task needs resolution.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, devices and/or modules. Those skilled in the art will appreciate that these blocks, units, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, devices, and/or modules being implemented by microprocessors or similar, they may be programmed using software (e.g., microcode) to perform various functions discussed herein and may optionally be driven by firmware and/or software. Alternatively, each block, unit, device, and/or module may be implemented by dedicated hardware, or as a combination of dedicated hardware to perform some functions and a processor (e.g., one or more programmed microprocessors and associated circuitry) to perform other functions. Also, each block, unit, device, and/or module of the example embodiments may be physically separated into two or more interacting and discrete blocks, units, devices, and/or modules without departing from the scope of the inventive concepts. Further, the blocks, units, devices, and/or modules of the example embodiments may be physically combined into more complex blocks, units, devices, and/or modules without departing from the scope of the present disclosure.

Figure 1:
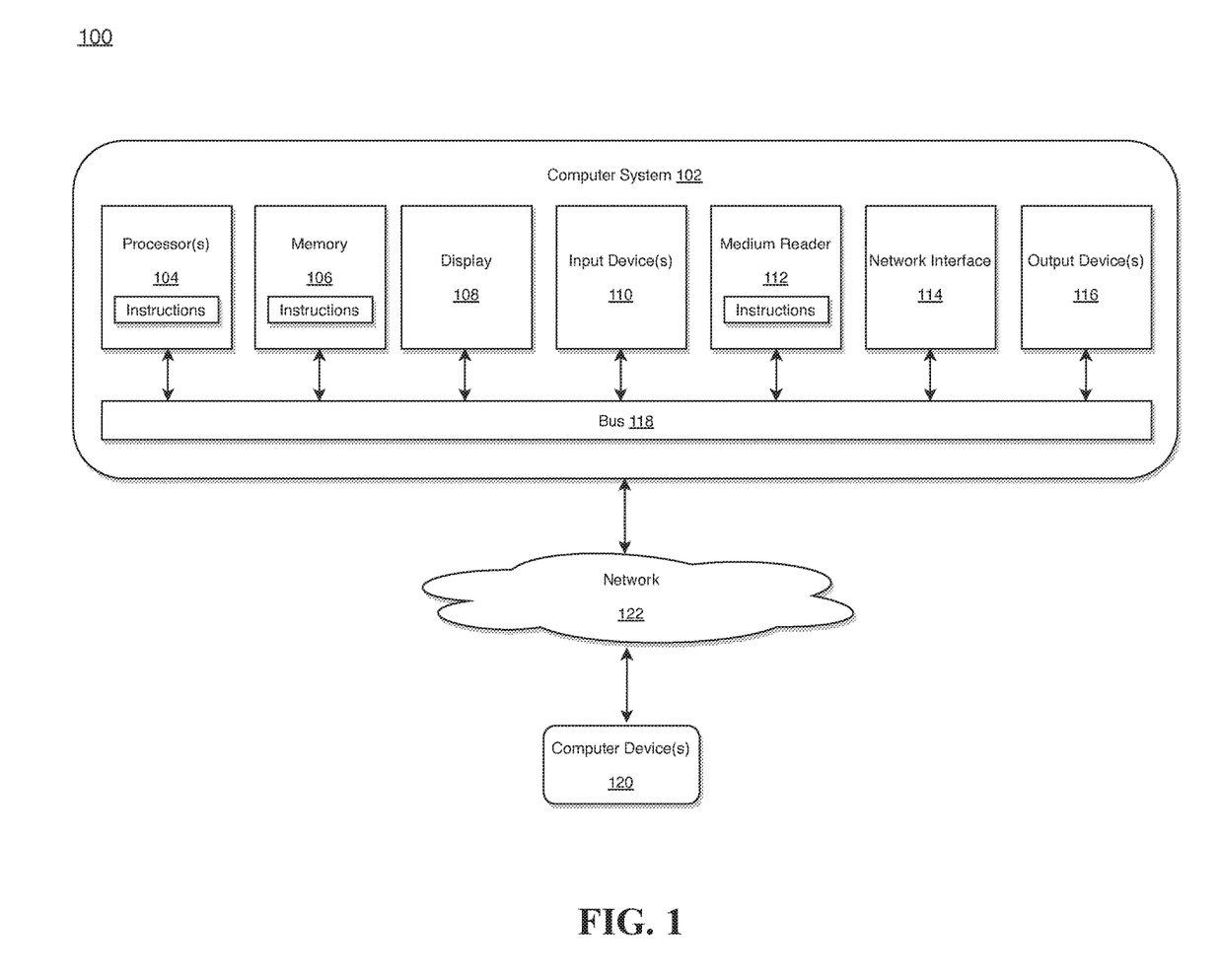
FIG. 1 illustrates a computer system for implementing a vulnerability feedback application device in accordance with an exemplary embodiment.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes for a vulnerability feedback application device for automatically checking for vulnerabilities and transmitting feedback directly to a code developer via a chat bot (i.e., an instant messaging software tool), thereby significantly reducing a lot of manual effort for the code developer and increasing efficiency in resolving vulnerabilities.

Figure 2:
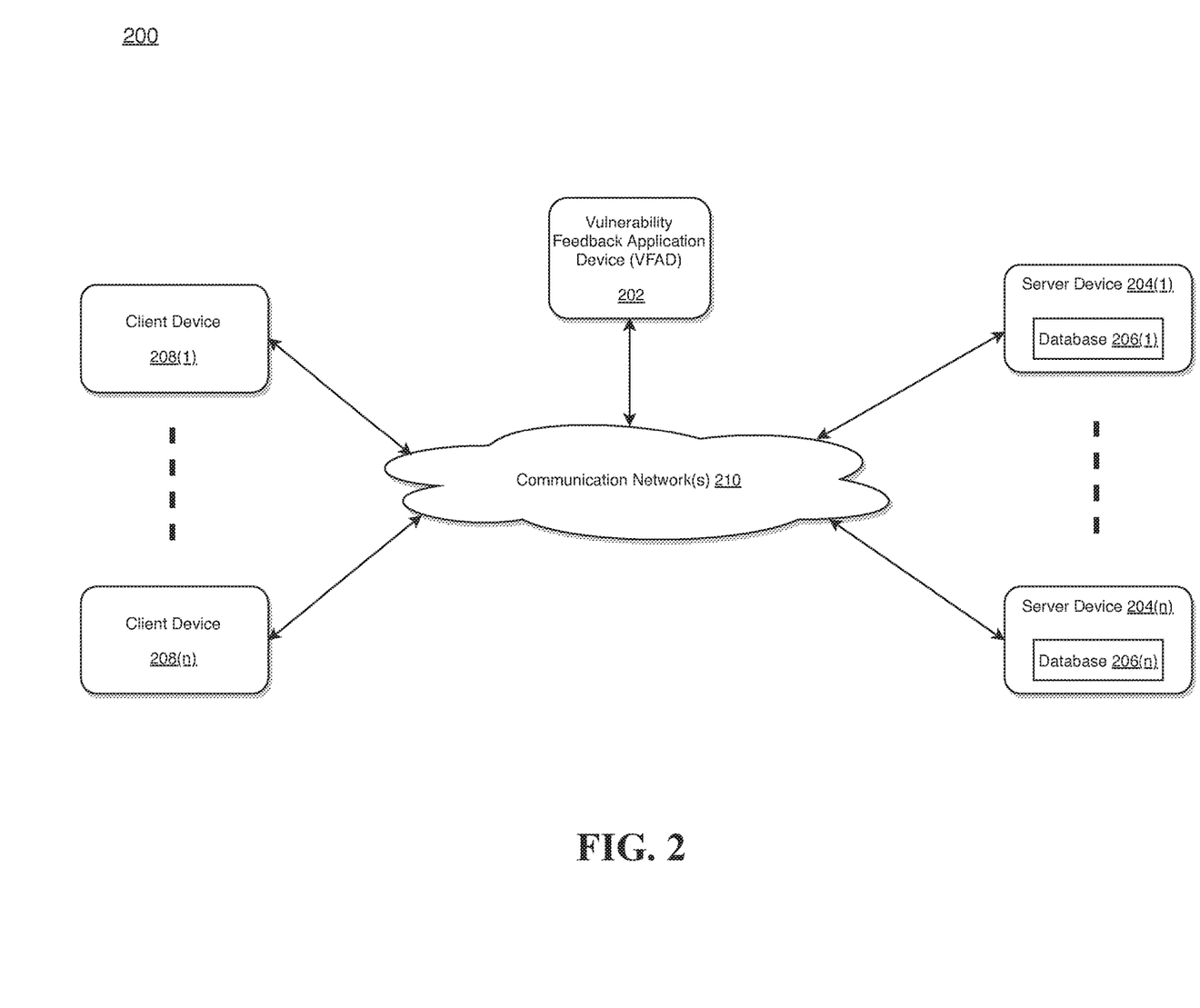
FIG. 2 illustrates an exemplary diagram of a network environment with a vulnerability feedback application device in accordance with an exemplary embodiment.

Referring to FIG. 2, a schematic of an exemplary network environment 200 for implementing a vulnerability feedback application device of the instant disclosure is illustrated.

Conventional system, that does not implement a vulnerability feedback application device of the instant disclosure, may not be able to detect vulnerabilities at the earliest opportunity and resolve them before continuing development work (i.e., code development), thereby significantly increasing cost of production and decreasing efficiency.

According to exemplary embodiments, the above-described problems associated with conventional system may be overcome by implementing a vulnerability feedback application device (VFAD) 202 as illustrated in FIG. 2. The VFAD 202 may be the same or similar to the computer system 102 as described with respect to FIG. 1.

The VFAD 202 may store one or more applications that can include executable instructions that, when executed by the VFAD 202, cause the VFAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the VFAD 202 itself ay be located in virtual server(s) running in a cloud-based computing environment rather than being tied to one or more specific physical network computing devices. Also, the application(s) may be running in one or more virtual machines (VMs) executing on the VFAD 202. Additionally, in one or more embodiments of this technology, virtual machine(s) running on the VFAD 202 may be managed or supervised by a hypervisor.

In the network environment 200 of FIG. 2, the VFAD 202 is coupled to a plurality of server devices 204(1)-204(n) that hosts a plurality of databases 206(1)-206(n), and also to a plurality of client devices 208(1)-208(n) via communication network(s) 210. A communication interface of the VFAD 202, such as the network interface 114 of the computer system 102 of FIG. 1, operatively couples and communicates between the VFAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication networks) 210 may be the same or similar to the network 122 as described with respect to MG. 1, although the VFAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modern, and the like), Public Switched Telephone Network (PSTNs), Ethernet-based Packet Data Networks (PDNs), combinations thereof, and the like.

The VFAD 202 may be a standalone device or integrated with one or more other devices or apparatuses, such as one or more of the server devices 204(1)-204(n), for example. In one particular example, the VFAD 202 may be hosted by one of the server devices 204(1)-204(n), and other arrangements are also possible. Moreover, one or more of the devices of the VFAD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the WAD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(l)-208(n) in this example may include any type of computing device that can facilitate the implementation of the VFAD 202 that may be configured for automatically checking for vulnerabilities at the earliest stage of code development and transmitting feedback directly to a code developer's computing device and/or his/her team's computing devices via an instant messaging chat bot so that the vulnerabilities are resolved before further code development, thereby significantly increasing efficiency and reducing cost. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the VFAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the VFAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the VFAD 202, the server devices 204(1)-204(n), or the client devices 208(1)-208(n), for example, may be configured to operate as virtual instances on the same physical machine. For example, one or more of the VFAD 202, the server devices 204(1)-204(n), or the client devices 208(1)-208(n) may operate on the same physical device rather than as separate devices communicating through communication network(s) 210. Additionally, there may be more or fewer VFADs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
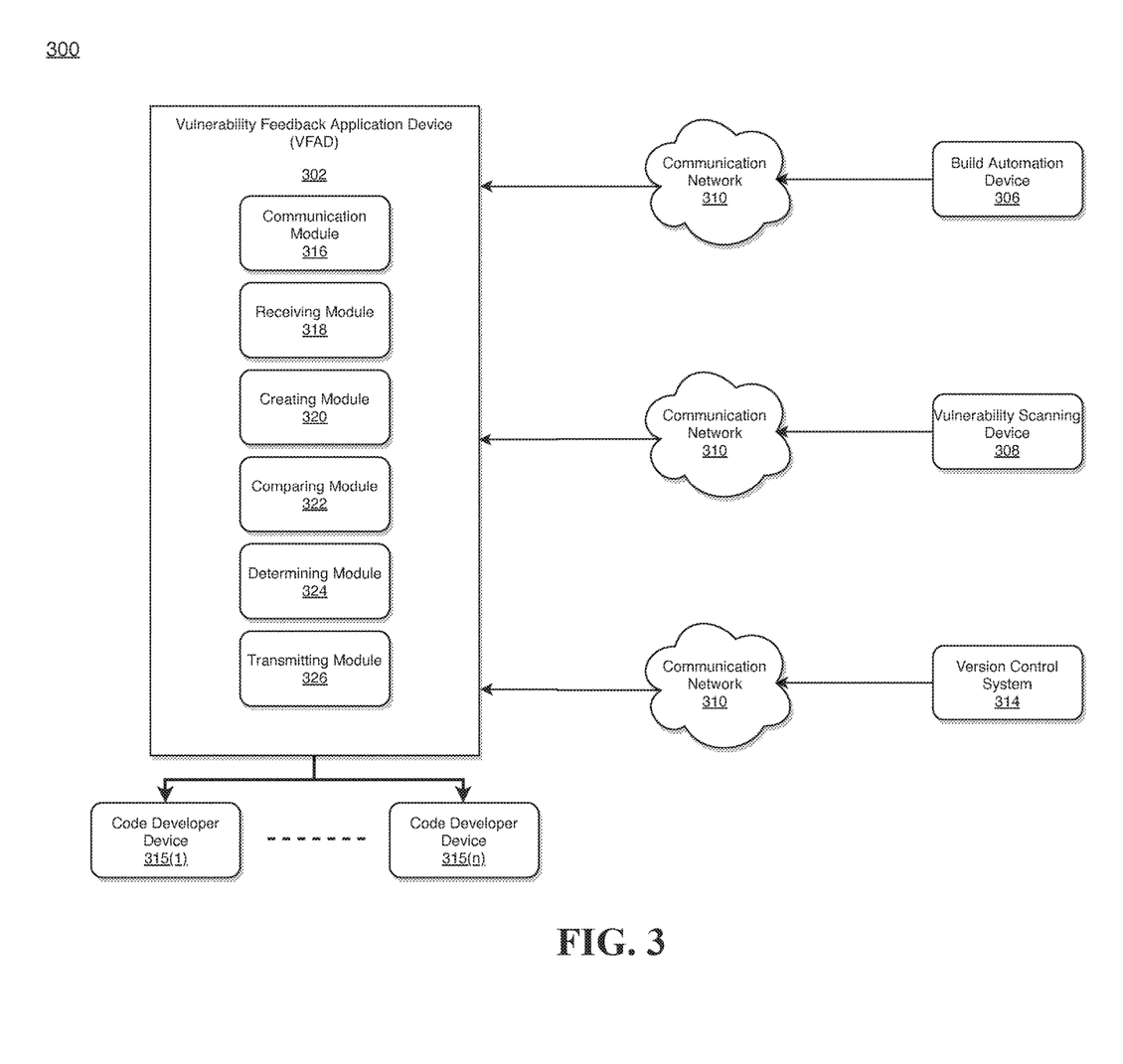
FIG. 3 illustrates a system diagram of a vulnerability feedback application device in accordance with an exemplary embodiment.

FIG. 3 illustrates a system diagram of a vulnerability feedback application device in accordance with an exemplary embodiment.

As illustrated in FIG. 3, the vulnerability feedback application device (VFAD) 302 may be connected to a build automation device 306, a vulnerability scanning device 308, a version control system 314, a plurality of code developer's devices 315(1)-315(n) via a communication network 310, but the disclosure is not limited thereto. According to exemplary embodiments, the VFAD 302 may be directly connected to the plurality of code developer's devices 315(1)-315(n). According to exemplary embodiments, the code developer's device 315(1) may be utilized by an original code developer and the remaining code developer's devices 315(2)-315(n) may be utilized by the team members of the original code developer, but the disclosure is not limited thereto. Any suitable arrangements may be made in sharing the code developer's devices without departing from the scope of the present disclosure. According to exemplary embodiments, the VFAD 302 may be configured to transmit vulnerability feedback directly to the one or more of the code developer's computing devices 315(1)-315(n) via an instant messaging software tool. According to exemplary embodiments, the instant messaging software tool may include, but not limited thereto, one or more of the following: text messaging software (e.g., short message service (SMS)) tool, Flock, Slack, Skype, Jabber, Zoho Cliq, Fuze, Workpalce by Facebook, Chatwing, WhatsApp, Rivers IM, Zoho Chat, ChatBlazer, echofin, messenger by Facebook.

According to exemplary embodiment, the VFAD 302 is described and shown in FIG. 3 as including various modules, although it may include other rules, policies, modules, databases, or applications, for example. According to exemplary embodiments, the local vulnerability database 314 may be embedded within the WAD 302. According to exemplary embodiments, the VFAD 302 may be configured to receive continuous feed of vulnerability data from the vulnerability scanning device 308 and store the continuous feed of vulnerability data onto a local vulnerability database (not shown), but the disclosure is not limited thereto. According to exemplary embodiments, VFAD 302 may be configured to receive continuous feed of vulnerability data from the vulnerability scanning device 308 as extensible markup language (XML) feed, but the disclosure is not limited thereto.

As illustrated in FIG. 3, according to exemplary embodiments, the VFAD 302 may include a communication module 316, a receiving module 318, a creating module 320, a comparing module 322, a determining module 324, and a transmitting module 326.

According to exemplary embodiments, as is traditional in the field of the present disclosure, each of the build automation device 306, the vulnerability scanning device 308, the version control system 314, the communication module 316, the receiving module 318, the creating module 320, the comparing module 322, the determining module 324, and the transmitting module 326 are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of each of the build automation device 306, the vulnerability scanning device 308, the version control system 314, the communication module 316, the receiving module 318, the creating module 320, the comparing module 322, the determining module 324, and the transmitting module 326 being implemented by microprocessors or similar, they may be programmed using software (e.g., microcode) to perform various functions discussed herein and may optionally be driven by firmware and/or software. Alternatively, each of the build automation device 306, the vulnerability scanning device 308, the version control system 314, the communication module 316, the receiving module 318, the creating module 320, the comparing module 322, the determining module 324, and the transmitting module 326 may be implemented by dedicated hardware, or as a combination of dedicated hardware to perform some functions and a processor (e.g., one or more programmed microprocessors and associated circuitry) to perform other functions.

Also, each of the communication module 316, the receiving module 318, the creating module 320, the comparing module 322, the determining module 324, and the transmitting module 326 of the example embodiments may be physically separated into two or more interacting and discrete blocks, units, devices, and/or modules without departing from the scope of the inventive concepts. Further, the communication module 316, the receiving module 318, the creating module 320, the comparing module 322, the determining module 324, and the transmitting module 326 of the example embodiments may be physically combined into more complex blocks, units, devices, and/or modules without departing from the scope of the present disclosure.

As will be described below, the VFAD 302 may be configured to automatically receive, on a daily basis, a listing of vulnerability exposures from a feed of vulnerabilities (e.g., an XML feed) from an external vulnerability database and stored in a local vulnerability database. According to exemplary embodiments, the stored listing of vulnerabilities may be updated when new information is ingested from a feed of vulnerabilities from the external vulnerability database. In an exemplary embodiment, changes to the local vulnerability database resulting from new or updated vulnerability data received from the external vulnerability database may be logged. In addition to ingesting current vulnerabilities, exemplary embodiments may also ingest historical vulnerability data from the XML feed and other sources (not shown).

According to exemplary embodiments, a list of vulnerability exposures may, include threat information and a user (e.g., a vulnerability threat analyst) may have the ability to edit items from the list of vulnerabilities stored in the local vulnerability database to supplement or modify those items.

The process may be executed via the communication network 310, which may comprise plural networks as described above. For example, in an exemplary embodiment, either one or all of the build automation device 306, vulnerability scanning device 308, and version control system 314 may communicate with the VFAD 302 via broadband or cellular communication. Of course, these embodiments are merely exemplary and are not limiting or exhaustive.

According to exemplary embodiments, the communication module 316 may be configured to establish a first communication path between an application embedded within the VFAD 302 and the build automation device 306 via the communication network 310. The communication module 316 may also be configured to establish a second communication path between the application embedded within the VFAD 302 and vulnerability scanning device 308 via the communication network 310. According to exemplary embodiments, the vulnerability scanning device 308 may be a cyber security scanning tool, but the disclosure is not limited thereto.

According to exemplary embodiments, the receiving module 318 may be configured to receive data from the build automation device 306 via the first communication path. According to exemplary embodiments, the data received from the build automation device may contain links to source code in the version control system 314 and security scans (i.e., cyber security scans) performed by the vulnerability scanning device 308. According to exemplary embodiments, the receiving module 318 may be configured to receive the data from the build automation device 306 as continuous feed on a daily basis and the VFAD 302 may be configured to store the feed of the data onto a local database (not shown). According to exemplary embodiments, the security scans may include a list of vulnerabilities and corresponding risks, but the disclosure is not limited thereto.

According to exemplary embodiments, a filtering module (not shown) may be configured to filter the received security scans to exclude vulnerabilities that are not applicable to systems managed and operated by an organization and store the filtered vulnerability data onto a local database.

In an exemplary embodiment, a listing of vulnerability exposures vulnerability data including threat information) may be ingested on a daily basis from an external vulnerability database as XML, feed. An example of external vulnerability database may be the National Vulnerability Database (NVD).

According to exemplary embodiments, the creating module 320 may be configured to create a task based on the received data received by the receiving module 318 and add the task to an application processing queue.

According to exemplary embodiments, the receiving module 318 may be further configured to receive security scan data (i.e., cyber security scan data) from the vulnerability scanning device 308 via the second communication path and receive production scan data from the version control system 314 via a third communication path, but the disclosure is not limited thereto. According to exemplary embodiments, the application embedded within the VFAD 302 may retrieve security scan data from the vulnerability scanning device 308 once scans are completed by the vulnerability scanning device 308 and retrieve production scan reports (i.e., code development/production data) from the version control system 314.

According to exemplary embodiments, the comparing module may be configured to compare the security scan data (i.e., cyber security scan data) received from the vulnerability scanning device 308 with the production scan data received from the version control system 314.

According to exemplary embodiments, the determination module 324 may be configured to determine, based on comparing, whether the security scan data generated by the vulnerability scanning device 308 includes new vulnerability data that is not currently included in the production scan data generated by the version control system 314.

According to exemplary embodiments, the transmitting module 326 may be configured to automatically transmit an electronic notification to one or more of the code developer devices 315(1)-315(n) when the determination module 324 determines that the security scan data includes new vulnerability data and that the task needs resolution. According to exemplary embodiments, the transmitting module 326 may be configured to automatically transmit an electronic notification directly to one or more of the code developer devices 315(1)-315(n) via an instant messaging software tool when the determination module 324 determines that the security scan data includes new vulnerability data and that the task needs resolution.

According to exemplary embodiments, the WAD 203 may be configured to automatically remove the task from the application processing queue when the determination module 324 determines that the security scan data does not include any new vulnerability data that is not already included in the production scan data.

According to exemplary embodiments, the receiving module 318 may be configured to receive identification information of a code developer associated with the production scan data from the version control system 314; the communication module 316 may be configured to link the identification information to the code developer device 315(1) which is utilized by a code developer who originally developed the code for production; and the transmitting module 326 may be configured to automatically transmit the electronic notification directly to the code developer device 315(1) via an instant messaging tool.

According to exemplary embodiments, the receiving module 318 may be configured to receive identification information of each member of the code developer associated with the production scan data from the version control system 314 based on the code developer's identification information; the communication module 316 may be configured to link the identification information of each team member to a corresponding code developer device 315(1)-315(n); and the transmitting module 326 may be configured to automatically transmit the electronic notification directly to each of the code developer devices 315(1)-315(n) via an instant messaging tool.

According to exemplary embodiments, the transmitting module 326 may be configured to automatically transmit the electronic notification directly to the code developer device 315(1) and to the corresponding devices 315(2)-315(n) of each team member via an instant messaging tool.

According to exemplary embodiments, a non-transitory computer readable medium may be configured to store instructions for transmitting vulnerability feedback to a code developer device. According to exemplary embodiments, the instructions, when executed, may cause a processor embedded within WAD 302 to perform the following: establishing a first communication path between an application and a build automation tool via a communication network; establishing a second communication path between the application and a cyber scanning tool via the communication network; receiving data from the build automation tool via the first communication path, the data containing links to source code in a version control system and cyber security scans; creating a task based on the received data and adding the task to an application processing queue; receiving cyber security scan data from the cyber scanning tool via the second communication path; receiving production scan data from the version control system; comparing the cyber security scan data with the production scan data; determining, based on comparing, whether the cyber security scan data includes new vulnerability data that is not currently included in the production scan data; and automatically transmitting an electronic notification to a code developer device when it is determined that the cyber security scan data includes new vulnerability data and that the task needs resolution. The processor may be the same or similar to the processor 104 as illustrated in FIG. 1 or the processor embedded within VFAD 202 and VFAD 302.

According to exemplary embodiments, the instructions, when executed, may cause a processor embedded within VFAD 302 to perform the following: automatically removing the task from the application processing queue when it is determined that the cyber security scan data does not include any new vulnerability data that is not already included in the production scan data.

According to exemplary embodiments, the instructions, when executed, may cause a processor embedded within VFAD 302 to perform the following: receiving identification information of a code developer associated with the production scan data from the version control system; linking the identification information to the code developer device; and automatically transmitting the electronic notification directly to the code developer device via an instant messaging tool.

According to exemplary embodiments, the instructions, when executed, may cause a processor embedded within VFAD 302 to perform the following: receiving identification information of a code developer associated with the production scan data from the version control system; receiving identification information of each team member of the code developer from the version control system based on the identification information of the code developer; and automatically transmitting the electronic notification to the code developer device and to corresponding devices of each team member via an instant messaging tool.

Figure 4:
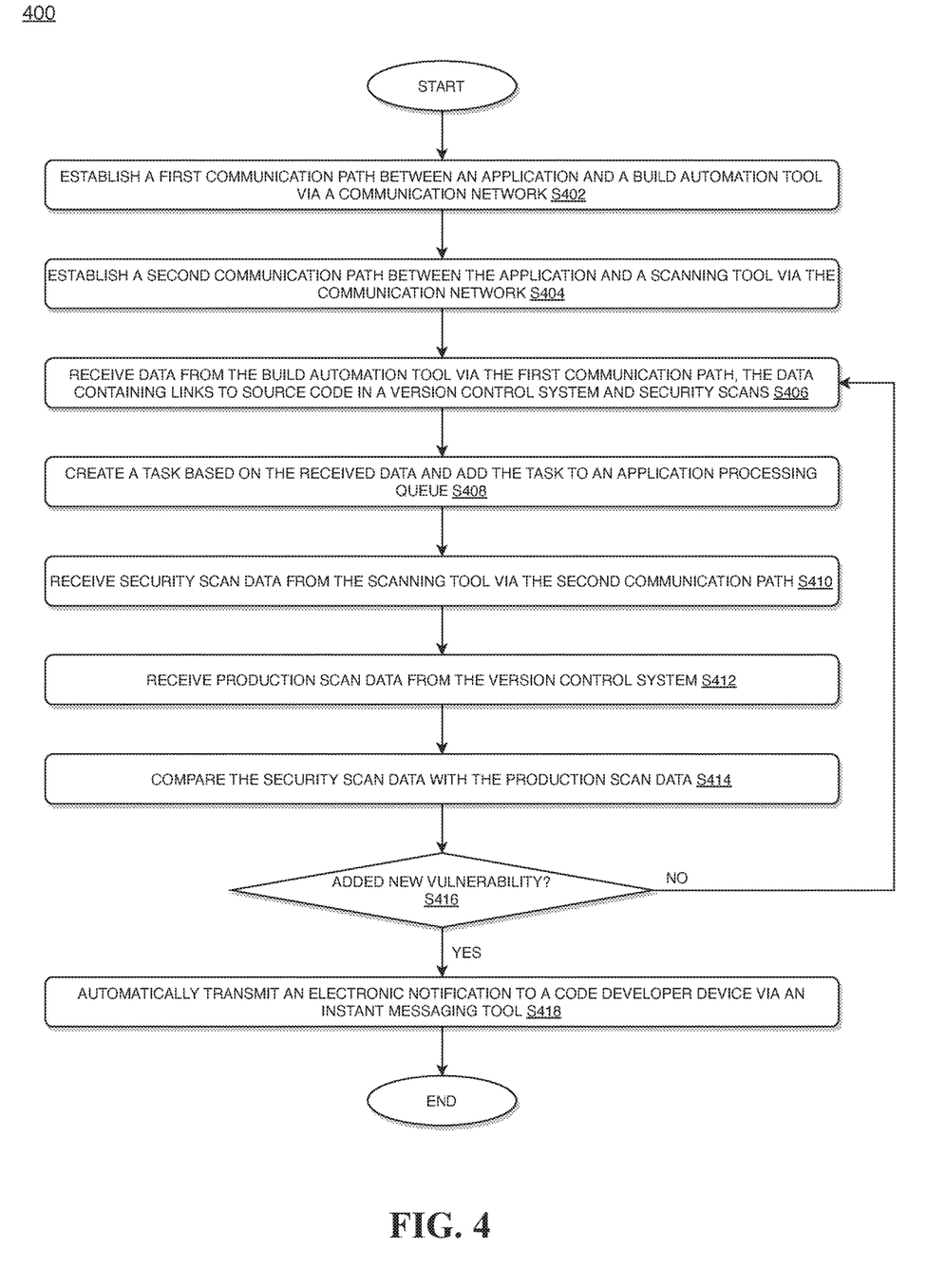
FIG. 4 a flow chart for providing vulnerability feedback to a developer's computing device in accordance with an exemplary embodiment.

FIG. 4 a flow chart for providing vulnerability feedback to a developer's computing device in accordance with an exemplary embodiment.

According to exemplary embodiments, in the process 400 of FIG. 4, at step S402, a first communication path may be established between an application and a build automation tool via a communication network.

At step S404, a second communication path may be established between the application and a cyber scanning tool via the communication network.

At step S406, data from the build automation tool may be received via the first communication path. According to exemplary embodiments, the data may contain links to source code in a version control system and cyber security scans. According to exemplary embodiments, the links may be uniform resource locators (ins).

At step S408, a task may be created based on the received data and added to an application processing queue.

At step S410, cyber security scan data may be received from the cyber scanning tool via the second communication path.

At step S412, production scan data may be received from the version control system.

At step S414, the cyber security scan data may be compared with the production scan data.

At step S416, it may be determined whether new vulnerability is added that is not currently included in the production scan data.

At step S418, an electronic notification is automatically transmitted to a code developer device, when at step S416, it is determined that the cyber security scan data includes new vulnerability data and that the task needs resolution.

According to exemplary embodiments, the process 400 may further include: automatically removing the task from the application processing queue when it is determined that the cyber security scan data does not include any new vulnerability data that is not already included in the production scan data.

According to exemplary embodiments, the process 400 may further include: receiving identification information of a code developer associated with the production scan data from the version control system; linking the identification information to the code developer device; and automatically transmitting the electronic notification directly to the code developer device via an instant messaging tool.

According to exemplary embodiments, the process may further include: receiving identification information of a code developer associated with the production scan data from the version control system; receiving identification information of each team member of the code developer from the version control system based on the identification information of the code developer; and automatically transmitting the electronic notification to the code developer device and to corresponding devices of each team member via an instant messaging tool.

According to exemplary embodiments, the process 400 may further include: automatically transmitting the electronic notification directly to the code developer device via an instant messaging tool when it is determined that the cyber security scan data includes new vulnerability data and that the task needs resolution.

In some exemplary embodiments, a data feed may include a uniform resource locator (URL) that "points" toward a patch intended to remediate a vulnerability. In such embodiments, the deployment of the patch may be automated.

In some exemplary embodiments, changes to the local vulnerability database as a result of new or updated vulnerability data may be logged so as to create a history of changes to a particular record or group of records. For example, if the common vulnerability feed indicates that a threat has increased in severity, the change in threat level (or score) may be recorded and transmitted to a code developer's computing device 315(1)-315(n) such that code developer can understand that a threat is increasing in severity and take such actions as are deemed necessary. In an exemplary embodiment, the threat level score ranges from 0 to 10 and functions to allow the code developer to prioritize a response or the proactive measures taken to address a particular vulnerability.

According to exemplary embodiments as disclosed above in FIGS. 1-4, the vulnerability feedback mechanism effected by the VAFD as disclosed herein may use a continuous integration pipeline and scan every feature branch, automatically check for vulnerabilities and deliver feedback directly to the developer via an instant messaging tool, thereby significantly reducing a lot of manual effort for the developer and increasing efficiency in resolving vulnerabilities.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. in a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for transmitting vulnerability feedback to a code developer device by utilizing one or more processors and one or more memories, the method comprising:
  establishing a first communication path between an application and a build automation tool via a communication network;

establishing a second communication path between the application and a scanning tool via the communication network;

receiving data from the build automation tool via the first communication path, the data containing links to source code in a version control system and security scans;

creating a task based on the received data and adding the task to an application processing queue;

receiving security scan data from the scanning tool via the second communication path;

receiving production scan data from the version control system;

comparing the security scan data with the production scan data;

determining, based on comparing, whether the security scan data includes new vulnerability data that is not currently included in the production scan data; and automatically transmitting an electronic notification to a code developer device when it is determined that the security scan data includes new vulnerability data and that the task needs resolution, wherein the automatically transmitting an electronic notification further comprises:

receiving identification information of a code developer associated with the production scan data from the version control system;

linking the identification information to the code developer device; and automatically transmitting the electronic notification directly to the code developer device via an instant messaging tool when it is determined that the security scan data includes new vulnerability data and that the task needs resolution.

2. The method according to claim 1, further comprising: automatically removing the task from the application processing queue when it is determined that the security scan data does not include any new vulnerability data that is not already included in the production scan data.

3. The method according to claim 1, wherein the automatically transmitting an electronic notification further comprises:

receiving identification information of each team member of the code developer from the version control system based on the identification information of the code developer; and automatically transmitting the electronic notification to the code developer device and to corresponding devices of each team member.

4. The method according to claim 3, further comprising: automatically transmitting the electronic notification directly to the code developer device and to the corresponding devices of each team member via the instant messaging tool.

5. A system for transmitting vulnerability feedback to a code developer device, comprising:

a processor;

a communication network; and one or more memories operatively connected to the processor via the communication network;

wherein the processor is configured to:

establish a first communication path between an application and a build automation tool via the communication network;

establish a second communication path between the application and a scanning tool via the communication network;

receive data from the build automation tool via the first communication path, the data containing links to source code in a version control system and security scans;

create a task based on the received data and add the task to an application processing queue;

receive security scan data from the scanning tool via the second communication path;

receive production scan data from the version control system;

compare the security scan data with the production scan data;

determine, based on comparing, whether the security scan data includes new vulnerability data that is not currently included in the production scan data; and automatically transmit an electronic notification to a code developer device when it is determined that the security scan data includes new vulnerability data and that the task needs resolution, wherein the processor is further configured to:

receive identification information of a code developer associated with the production scan data from the version control system;

link the identification information to the code developer device; and automatically transmit the electronic notification directly to the code developer device via an instant messaging tool when it is determined that the security scan data includes new vulnerability data and that the task needs resolution.

6. The system according to claim 5, wherein the processor is further configured to:

automatically remove the task from the application processing queue when it is determined that the security scan data does not include any new vulnerability data that is not already included in the production scan data.

7. The system according to claim 5, wherein the processor is further configured to:

receive identification information of each team member of the code developer from the version control system based on the identification information of the code developer; and automatically transmit the electronic notification to the code developer device and to corresponding devices of each team member.

8. The system according to claim 7, wherein the processor is further configured to:

automatically transmit the electronic notification directly to the code developer device and to the corresponding devices of each team member via the instant messaging tool.

9. A non-transitory computer readable medium configured to store instructions for transmitting vulnerability feedback to a code developer device, wherein when executed, the instructions cause a processor to perform the following:

establishing a first communication path between an application and a build automation tool via a communication network;

establishing a second communication path between the application and a scanning tool via the communication network;

receiving data from the build automation tool via the first communication path, the data containing links to source code in a version control system and security scans;
creating a task based on the received data and adding the task to an application processing queue;
receiving security scan data from the scanning tool via the second communication path;
receiving production scan data from the version control system;
comparing the security scan data with the production scan data;
determining, based on comparing, whether the security scan data includes new vulnerability data that is not currently included in the production scan data; and
automatically transmitting an electronic notification to a code developer device when it is determined that the security scan data includes new vulnerability data and that the task needs resolution,
wherein when executed, the instructions further cause the processor to perform the following:
receiving identification information of a code developer associated with the production scan data from the version control system;
linking the identification information to the code developer device; and
automatically transmitting the electronic notification directly to the code developer device via an instant messaging tool when it is determined that the security scan data includes new vulnerability data and that the task needs resolution.

10. The non-transitory computer readable medium according to claim 9, wherein when executed, the instructions further cause the processor to perform the following:
automatically removing the task from the application processing queue when it is determined that the security scan data does not include any new vulnerability data that is not already included in the production scan data.

11. The non-transitory computer readable medium according to claim 9, wherein when executed, the instructions further cause the processor to perform the following:
receiving identification information of each team member of the code developer from the version control system based on the identification information of the code developer; and
automatically transmitting the electronic notification to the code developer device and to corresponding devices of each team member via the instant messaging tool.

* * * * *